(12) United States Patent
Chuang

(10) Patent No.: US 11,117,081 B2
(45) Date of Patent: Sep. 14, 2021

(54) STACKABLE AIR FILTER MODULE

(71) Applicant: Ye Siang Enterprise Co., Ltd., New Taipei (TW)

(72) Inventor: Shih-Chieh Chuang, New Taipei (TW)

(73) Assignee: Ye Siang Enterprise Co., Ltd., New Taipei (TW)

( * ) Notice: Subject to any disclaimer, the term of this patent is extended or adjusted under 35 U.S.C. 154(b) by 265 days.

(21) Appl. No.: 16/423,148

(22) Filed: May 27, 2019

(65) Prior Publication Data

US 2020/0338487 A1    Oct. 29, 2020

(30) Foreign Application Priority Data

Apr. 23, 2019  (TW) .................................. 108114189

(51) Int. Cl.
   *B01D 46/00*    (2006.01)
   *B01D 46/10*    (2006.01)
   *B01D 46/52*    (2006.01)

(52) U.S. Cl.
   CPC ..... *B01D 46/0023* (2013.01); *B01D 46/0002* (2013.01); *B01D 46/0093* (2013.01); *B01D 46/10* (2013.01); *B01D 2279/51* (2013.01)

(58) Field of Classification Search
   CPC ............... B01D 46/0023; B01D 46/10; B01D 46/0002; B01D 46/0013; B01D 46/0093; B01D 46/521; B01D 46/526; B01D 2279/51
   USPC ......... 55/490, 497, 498, 502, 504, 503, 521, 55/495, 527, DIG. 31; 210/435; 428/212, 220, 903; 442/346, 351, 412, 442/389
   See application file for complete search history.

(56) References Cited

U.S. PATENT DOCUMENTS

| | | | | |
|---|---|---|---|---|
| 3,707,046 A | * | 12/1972 | De Baun | B01D 46/12 55/483 |
| 6,159,260 A | * | 12/2000 | Hammes | B01D 46/10 55/490 |
| 6,171,684 B1 | * | 1/2001 | Kahlbaugh | B01D 27/06 428/212 |
| 2004/0182055 A1 | * | 9/2004 | Wynn | B01D 46/0016 55/497 |
| 2008/0209868 A1 | * | 9/2008 | Schramm | F01N 3/0226 55/282.2 |
| 2009/0178377 A1 | * | 7/2009 | Cheng | B01D 46/0086 55/385.1 |

(Continued)

FOREIGN PATENT DOCUMENTS

| CN | 204853893 U | 12/2015 |
|---|---|---|
| CN | 108722051 A | 11/2018 |

(Continued)

*Primary Examiner* — Minh Chau T Pham
(74) *Attorney, Agent, or Firm* — CKC & Partners Co., LLC

(57) ABSTRACT

A stackable air filter module includes a base gas filter unit and at least one additional gas filter unit. The base filter unit includes a metal frame and at least one first filter body located in the filter passage of the metal frame. At least one additional filter unit is detachably superposed on the base filter unit, and the additional filter unit includes a filter frame and a second filter body located in the filter passage of the filter frame. The service life of the filter material contained in the first filter body is greater than the service life of the filter material contained in the second filter body.

9 Claims, 6 Drawing Sheets

(56) References Cited

U.S. PATENT DOCUMENTS

2010/0307118 A1* 12/2010 Kawano ............... B01D 46/125
                                                                    55/483
2013/0318936 A1* 12/2013 Ball ..................... B01D 46/001
                                                                    55/483
2015/0265959 A1*  9/2015 Crabtree ............ B01D 46/0023
                                                                    55/485

FOREIGN PATENT DOCUMENTS

TW          M273694 U     8/2005
TW          M550381 U    10/2017

* cited by examiner

STACKABLE AIR FILTER MODULE

CROSS-REFERENCE TO RELATED APPLICATION

This application claims priority to Taiwan Application Serial Number 108114189, filed Apr. 23, 2019, which is herein incorporated by reference in its entirety.

BACKGROUND

Field of Invention

The present invention relates to an air filter module. More particularly, the present invention relates to an air filter module for a clean room system.

Description of Related Art

Both the semiconductor and optoelectronic industries require large areas of clean room space to place their production lines inside to meet the required process requirements. When the factory area of the clean room system is growing, the air filtration system corresponding to the demand is also gradually large, and the requirements for the filtration effect are gradually increased.

Air filtration system in the front section of the top of the factory area of the traditional clean room system is mostly based on a metal frame, and the filter gas portion is filled into the metal frame, and then the gel is bonded to ensure airtightness. When the filter unit loses its effectiveness, the metal frame and the filter unit are removed as a whole for subsequent environmental protection.

Periodically replacing a large number of air filter modules in the air filtration system of the clean room system is needed, and the cost of the air filter module and the labor cost of replacement are both expensive.

SUMMARY

The present invention provides a stackable air filter module to resolve the problem in the prior art.

According to an embodiment of the disclosure, a stackable air filter module includes a base gas filter unit and at least one additional gas filter unit. The base gas filter unit includes a metal frame and at least one first filter body located within at least one filter channel of the metal frame. The additional gas filter unit is detachably superposed on the base gas filter unit, and the additional gas filter unit includes a filter frame and a second filter body located within a filter channel of the filter frame. The filter materials contained in the first filter body have a service life greater than that of filter materials contained in the second filter body.

In an embodiment of the disclosure, filter materials contained in the first filter body have the service life two times greater than that of filter materials contained in the second filter body.

In an embodiment of the disclosure, the filter channel of the metal frame has a cross-sectional area equal to that of the filter channel of the filter frame.

In an embodiment of the disclosure, the air filter module further include at least one second additional gas filter unit detachably superposed on the at least one additional gas filter unit, the second additional gas filter unit includes a third filter body, wherein filter materials contained in the second filter body have a service life greater than that of filter materials contained in the third filter body.

In an embodiment of the disclosure, the filter frame is made from metal materials.

In an embodiment of the disclosure, the filter frame is made from non-metal fireproof materials.

In an embodiment of the disclosure, the filter frame includes an outer metal frame and an inner non-metal fireproof frame, and the filter channel of the metal frame has a cross-sectional area equal to that of the filter channel of the filter frame.

In an embodiment of the disclosure, the inner non-metal fireproof frame has a lower surface that is mutually complementary to an upper surface of the metal frame to form an airtight interface.

In an embodiment of the disclosure, the at least one filter channel of the metal frame includes multiple filter channels.

In an embodiment of the disclosure, the metal frame has a height greater than or equal to that of the filter frame.

In sum, the air filter module of the present invention includes a base gas filter unit and an additional gas filter unit, and the service life of the filter material contained in the base gas filter unit is greater than the service life of the filter material contained in the additional gas filter unit. In order to reduce a replace frequency of or not replace the base gas filter unit, increasing a replace frequency of or replacing only the additional gas filter unit containing the short-life filter material, a total frequency of replacing the gas filter units in the air filter module can be reduced. In addition, the air filter module utilizes the airtight interface between the gas filter units, which enable the gas filter units to be vertically stacked without the glue, and has a positioning function to prevent the left and right offset of the stacked gas filter units.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
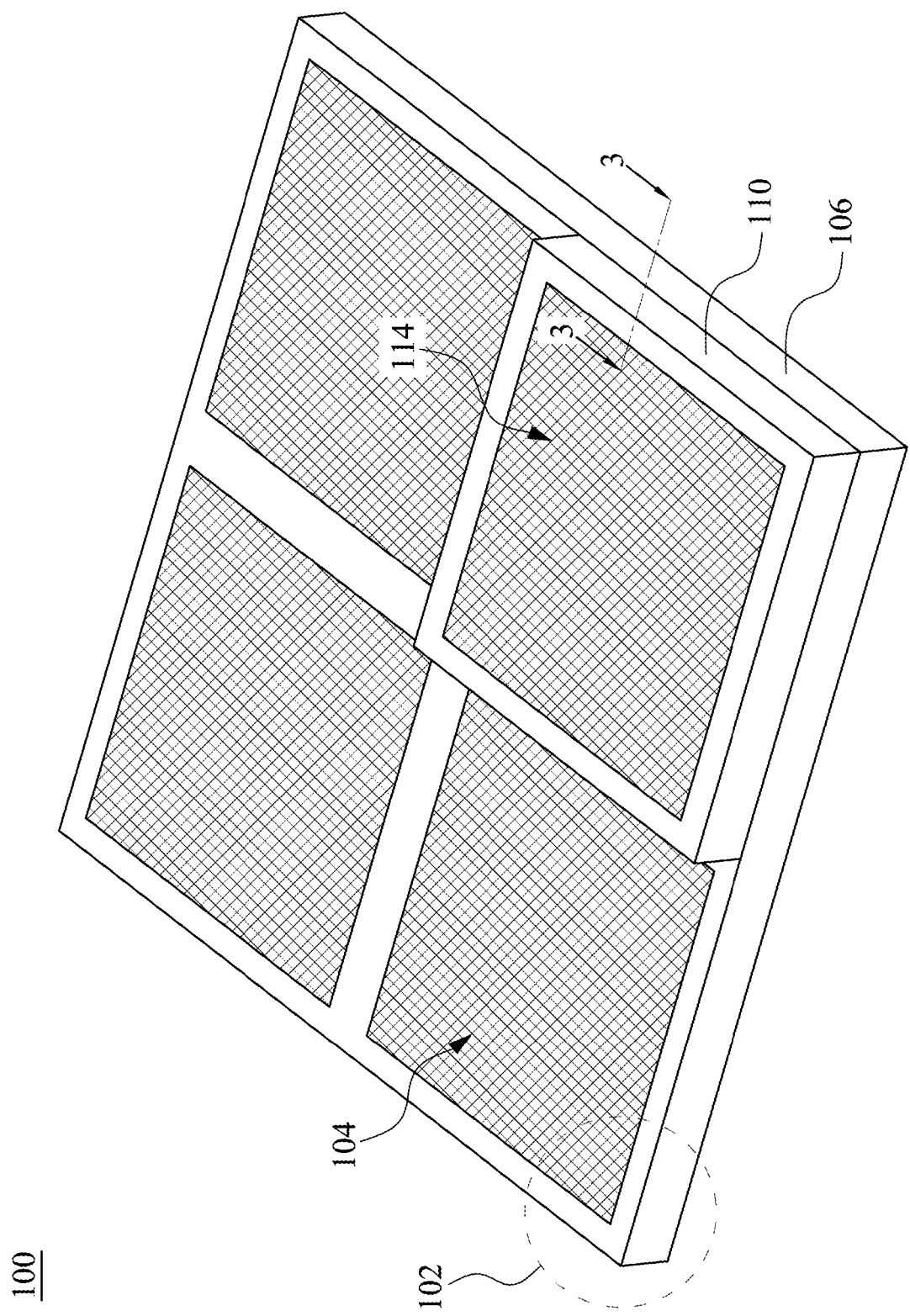
FIG. 1 illustrates a perspective view of a stackable air filter module according to an embodiment of the disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
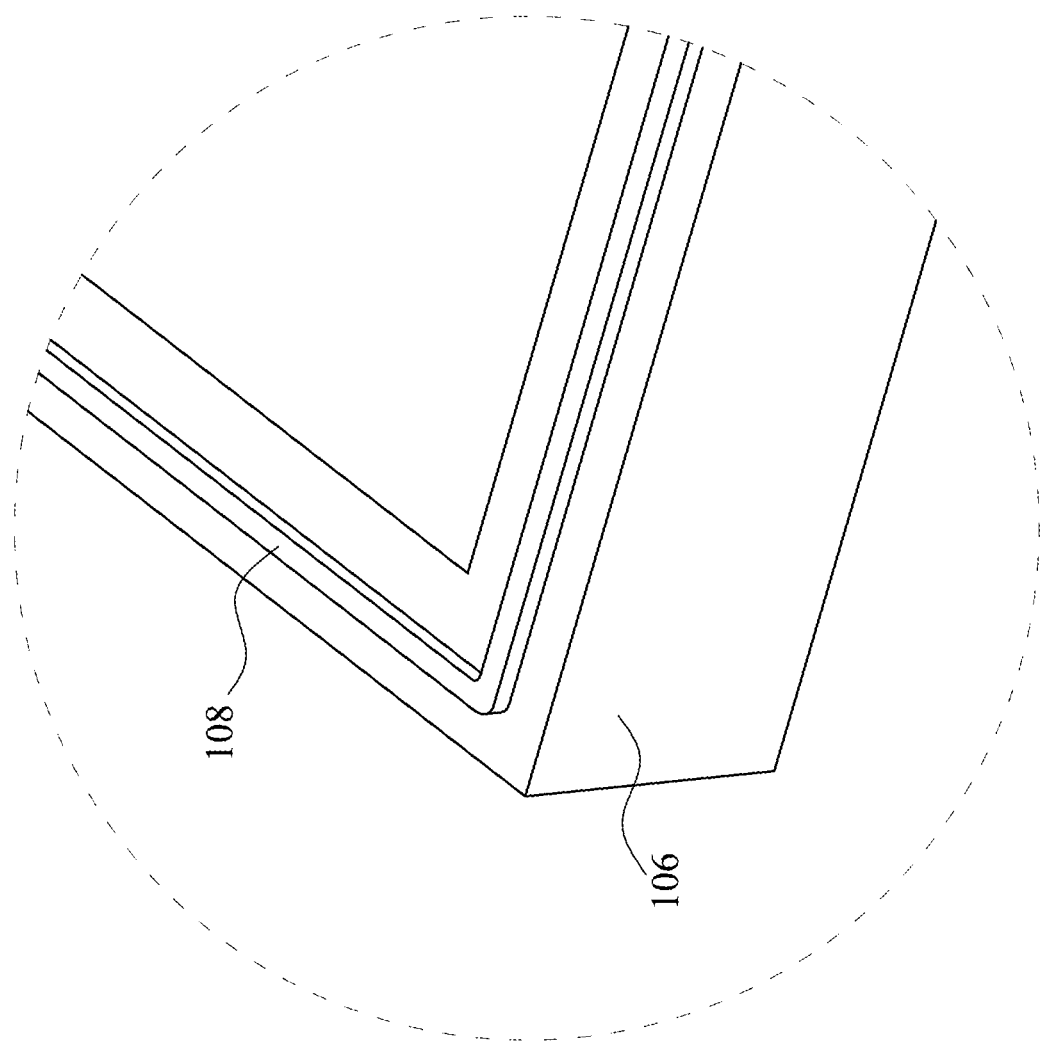
FIG. 2 illustrates an enlarged view of a portion 102 of FIG. 1.
Figure 3:
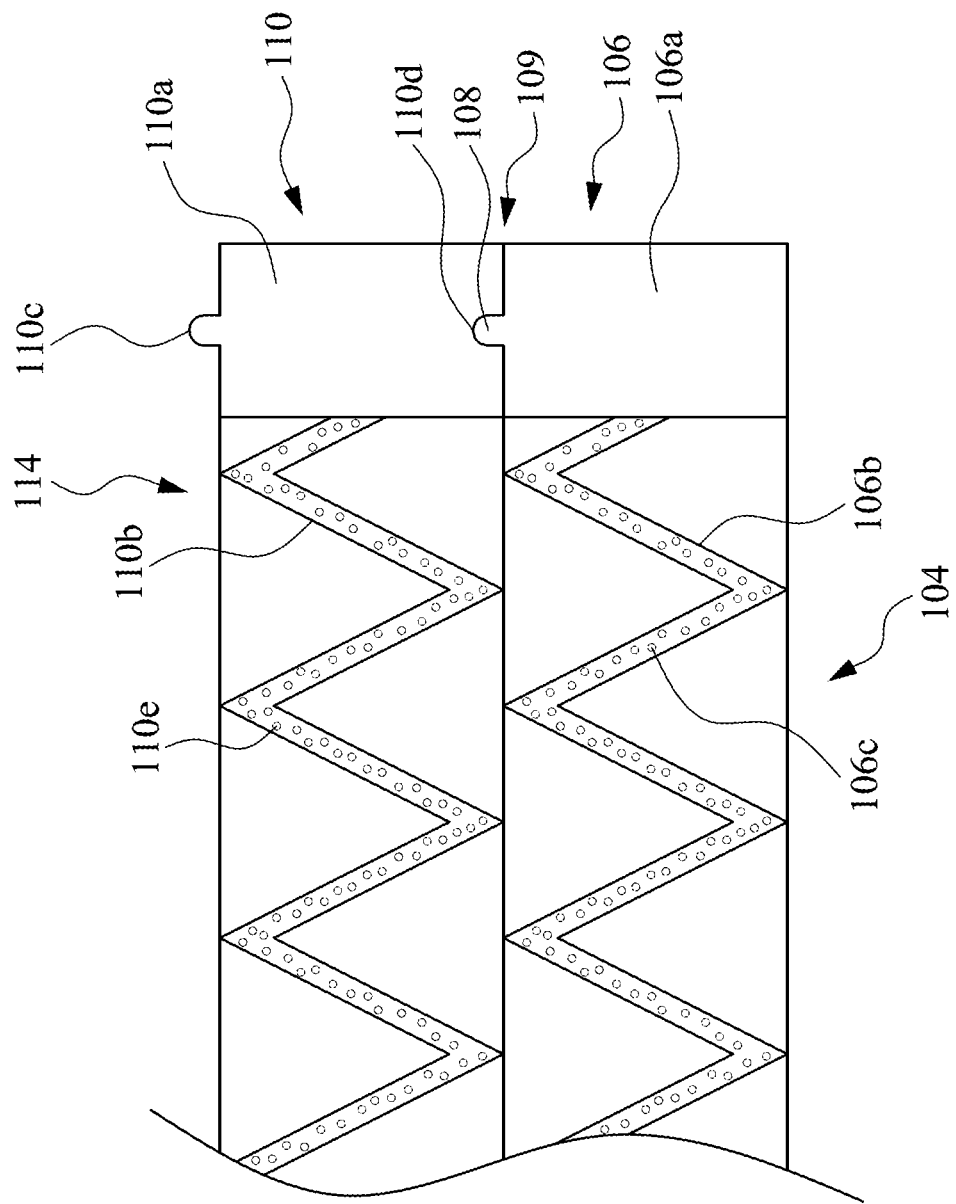
FIG. 3 illustrates a cross-sectional view taken from the line 3-3 in FIG. 1.

Reference is made to FIGS. 1-3. FIG. 1 illustrates a perspective view of a stackable air filter module according to an embodiment of the disclosure, FIG. 2 illustrates an enlarged view of a portion 102 of FIG. 1, and FIG. 3 illustrates a cross-sectional view taken from the line 3-3 in FIG. 1. A stackable air filter module 100 includes a base gas filter unit 106 and at least one additional gas filter unit 110. The base gas filter unit 106 includes a metal frame 106a and at least one filter body 106b located in the filter channel 104 of the metal frame 106a. The filter body 106b contains required filter materials 106c. The metal frame 106a may include one or more filter channels 104. An additional gas filter unit 110 is detachably superposed over the base gas filter unit 106 to cover one or more filter channels 104 (only one additional gas filter unit 110 is shown).

Each additional gas filter unit 110 includes a filter frame 110a and a filter body 110b, which is located in a filter channel 114 of the filter frame 110a. The filter body 110b contains required filter materials 110e.

In this embodiment, the filter body 106b or the filter body 110b is folded into a wave shape and then adhered to the filter channel of the filter frame, but the filter body is not limited to the folded shape shown in the drawings.

When the additional gas filter unit 110 is vertically superimposed on an upper surface of the metal frame 106a, the filter channel 114 of each additional gas filter unit 110 is aligned with a corresponding filter channel 104. In other words, a cross-sectional area of the filter channel 104 and a cross-sectional area of the filter channel 114 are equal. Similarly, multiple additional gas filter units 110 may be vertically stacked, and the filter channels 114 thereof are aligned and share substantially the same cross-sectional areas.

In an embodiment of present invention, the filter body 106b has a service life of filter materials that is greater than that of the filter materials contained in the filter body 110b. In another embodiment of the present invention, the filter body 106b has a service life of filter materials higher than twice the service life of the filter materials contained in the filter body 110b. For example, the filter body 106b has a service life of filter materials exceeding 24 months, and the filter body 110b contains filter materials with a service life of about 12 months, but not limited to this. Utilizing filter materials with different service life time for the base gas filter unit and the additional gas filter unit is configured to reduce a frequency of or not replace the base gas filter unit, and to increase a replace frequency of or replace only the additional gas filter unit 110 containing filter materials with shorter service life time such that a total frequency of replacing the gas filter units as a whole can be reduced.

If more than two layers of additional gas filter unit 110 are superimposed above the base gas filter unit 106, the service life of the filter materials contained in the lower additional gas filter unit 110 may be greater than that of the filter materials contained in the upper additional gas filter unit 110. That is, the service life times of the filter materials contained in the gas filter units are reduced from lower one to upper one. Utilizing two layers of additional gas filter unit 110 can also reduce a total disassembly frequency of the additional gas filter units 110.

Conventionally, a metal frame of a gas filtering unit is designed to have a replaceable filter body, but the metal processing cost is high. The metal frame with a pullout design to swap the replaceable filter body is much higher in manufacturing cost than a general metal frame without the pullout design. Moreover, the metal frame with the pullout design is also more susceptible to damage than the general metal frame without the pullout design, and thus increases an overall cost of the air filtration system.

The filter materials contained in the filter body include chemical carbon materials such as activated carbon, ion exchange resin, modified alumina, modified zeolite, and modified activated carbon, but are not limited thereto. The above filter materials are used to treat four types of airborne molecular pollutants in a clean room including: (1) Acids: Corrosive substances, which have the reaction characteristics of electron acceptors in chemical reactions, such as hydrofluoric acid, sulfuric acid, hydrochloric acid, nitric acid, phosphoric acid, and hydrobromic acid, and referred as MA; (2) Alkaline contaminants (Bases): also corrosive substances, which are electron donors in chemical reactions. Such compounds are prone to react with acidic substances to produce salts such as ammonia, ammonium hydroxide, methyl ammonia, or Dimethylammonium, diethanolamine, and referred as MB; (3) Condensables: A chemical substance (except water) that has a boiling point above room temperature and can condense on a clean surface at atmospheric pressure, so it will condense on the wafer at a semiconductor plant, such as: Silicone, or hydrocarbon Compound, and referred as MC; and (4) Dopants: Chemical elements that change the electrical properties of semiconductor materials, such as boron (B, usually boric acid or boron trifluoride), phosphorus (P, usually organophosphorus), or arsenic (As, usually Arsenate), and referred as MD.

Different clean rooms may have different demands for the filter materials contained in the filter body due to different production products, and the service life of the filter materials will also be different. Therefore, the filter materials to be contained in the base gas filter unit 106 and the additional gas filter unit 110 designed for different clean room systems may have great differences.

The filter body 110b of each additional gas filter unit 110 is aligned with the corresponding filter channel 104 and the filter body 106b therein. One or more additional gas filter units 110 are superimposed on top of a single filter channel 104. When the additional gas filter unit 110 is vertically superposed on the base gas filter unit 106 or when the plurality of additional gas filter units 110 are vertically overlapped with each other, the vertical joint faces need to be airtight, so that all the gas to be filtered is filtered through the filter body. To prevent leakage through the joint surface.

The filter body 110b of each additional gas filter unit 110 is aligned with the corresponding filter channel 104 and the filter body 106b therein. One or more additional gas filter units 110 may be superimposed above a single filter channel 104. When the additional gas filter unit 110 is vertically superposed on the base gas filter unit 106 or when multiple additional gas filter units 110 are vertically overlapped with each other, a joint interface need to be airtight such that gas is filtered through the filter body and leakage through the joint interface can be avoided.

The metal frame 106a has an upper surface, and the filter frame 110a of each additional gas filter unit 110 has a lower surface mutually complementary to the upper surface of the metal frame 106a to form an airtight interface such that gas leakage through the joint interface can be avoided. For example, the upper surface of the metal frame 106a has a convex member 108 (the remaining upper surface is a flat surface), and the lower surface of the filter frame 110a of each additional gas filter unit 110 has a concave member 110d (the remaining lower surface is a flat surface). When the lower surface of the filter frame 110a of each of the additional gas filter units 110 contacts the upper surface of the corresponding metal frame 106a and the convex member 108 and the concave member 110d are mutually complementary to each other, a hermetic or airtight interface 109 is formed.

When multiple additional gas filter units 110 are vertically stacked one upon another, a hermetic or airtight interface is also required between immediately-adjacent two gas filter units. For example, the lower surface of the filter frame 110a of each additional gas filter unit 110 has a concave member 110d (the remaining lower surface is a flat surface), and the upper surface of the filter frame 110a of each additional gas filter unit 110 has a convex member 110c (the remaining upper surface is a flat surface). When the upper surface of the filter frame 110a of the lower additional gas filter units 110 contacts the lower surface of the filter frame 110a of the upper additional gas filter unit 110, and the convex member 110c and the concave member 110d are mutually complementary to each other, a hermetic or airtight interface can be formed. In other words, the filter frame 110a of each additional gas filter unit 110 has an upper surface identical to the upper surface of the metal frame 106a.

The filter frame 110a of the additional gas filter unit 110 is made of a metal or non-metal fireproof material (for example, a hard plastic material) for the purpose of supporting the filter body 110b, but is not limited thereto. When the additional gas filter unit 110 is vertically overlapped or superposed on the upper surface of the metal frame 106a, the hermetic or airtight interface can be brought to the required airtightness by the overall weight, and the adhesive material is not required in the hermetic or airtight interface. When the additional gas filter unit 110 is subsequently removed, the time consuming steps of removing the adhesive material can be avoided.

Figure 4:
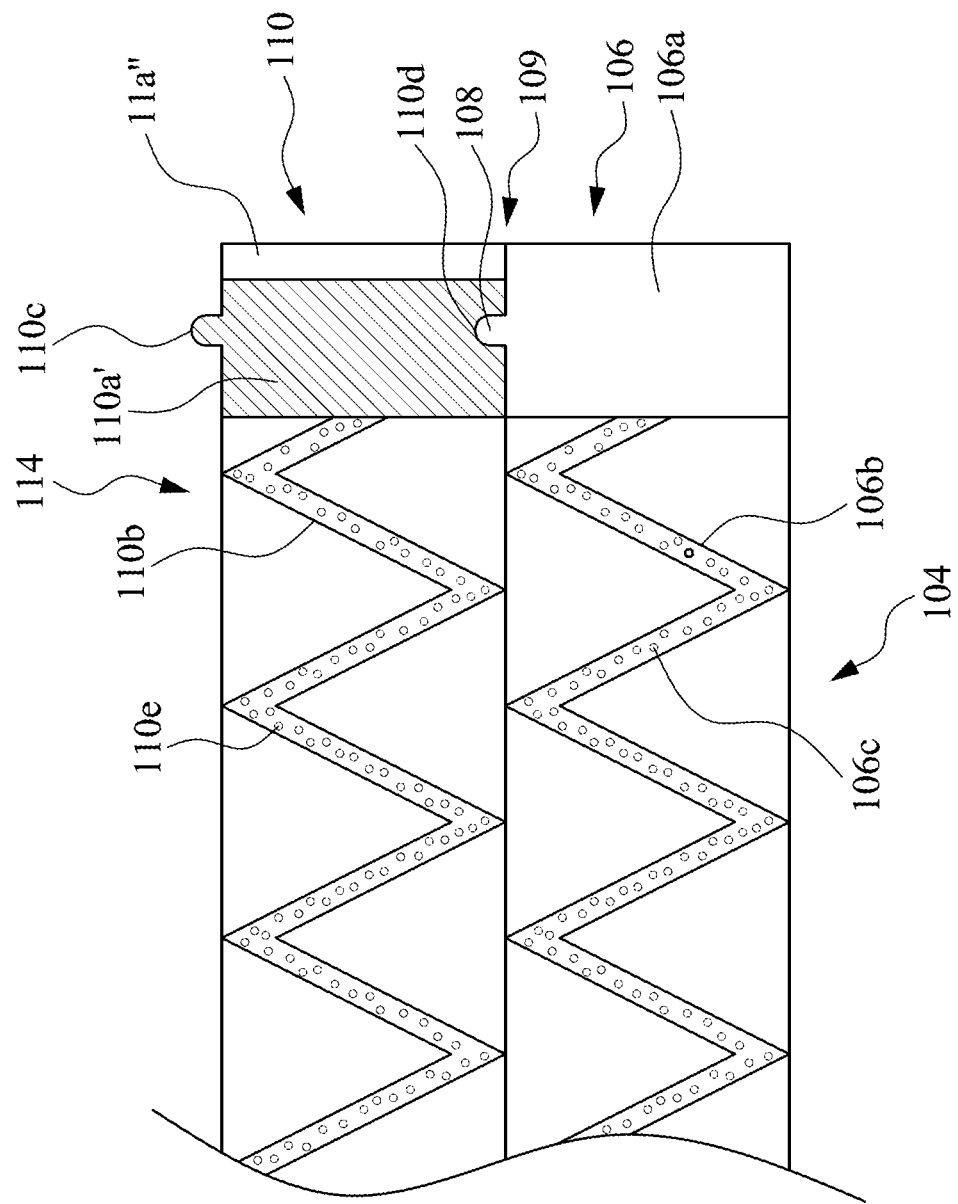
FIG. 4 illustrates a cross-sectional view of a stackable air filter module according to another embodiment of the disclosure.

Reference is made to FIG. 4, which illustrates a cross-sectional view of a stackable air filter module according to another embodiment of the disclosure. The filter frame of the additional gas filter unit 110 of this embodiment is different from the foregoing embodiment. Specifically, the filter frame of the additional gas filter unit 110 includes an outer metal frame 110a" and an inner non-metal fireproof frame 110a', thereby reducing the weight. The airtight interface between the convex member 110c and the concave member 110d is located at the inner non-metal fireproof frame 110a' because the non-metal fireproof material is easier to process the airtight joint interface than the metal material. The outer metal frame 110a" is generally higher in fire resistance than the inner non-metal fireproof frame 110a' such that the outer metal frame surrounds the inner non-metal fireproof frame can increase the overall fire resistance and refractory rating of the composite frame.

Figure 5:
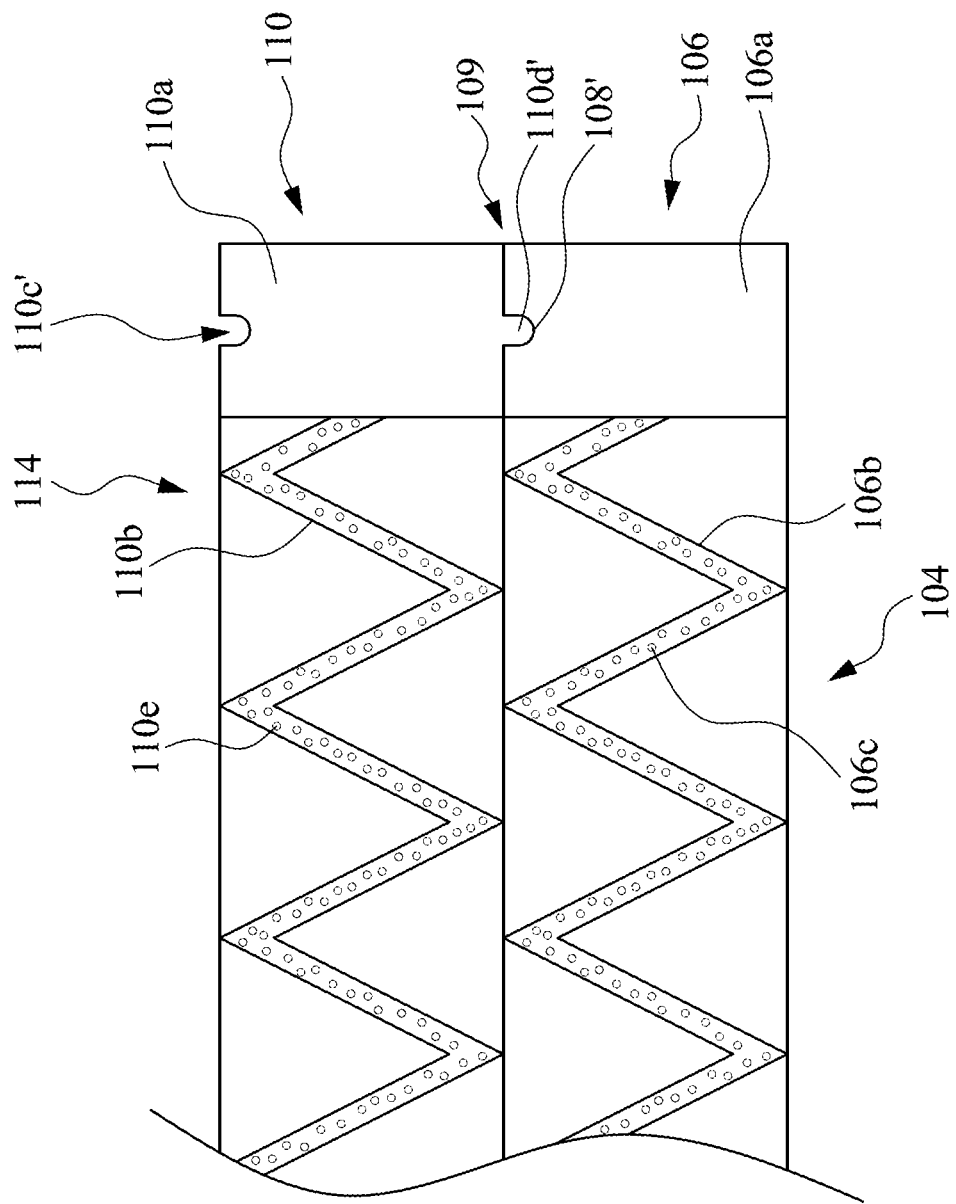
FIG. 5 illustrates a cross-sectional view of a stackable air filter module according to still another embodiment of the disclosure.

Reference is made to FIG. 5, which illustrates a cross-sectional view of a stackable air filter module according to still another embodiment of the disclosure. In this embodiment, the upper surface of the metal frame 106a has a concave member 108' (the remaining upper surface is a flat surface), and the lower surface of the filter frame 110a of each additional gas filter unit 110 has a convex member 110d' (the remaining lower surface is a flat surface). When the lower surface of the filter frame 110a of each additional gas filter unit 110 contacts the upper surface of the corresponding metal frame 106a, and the concave member 108' and the convex member 110d' are mutually complementary to each other, a hermetic or airtight interface 109 is formed.

In addition, the upper surface of the filter frame 110a of each additional gas filter unit 110 also has a concave member 110c'. In other words, the filter frame 110a of each additional gas filter unit 110 has an upper surface identical to the upper surface of the metal frame 106a such that multiple additional gas filter units 110 can be vertically stacked.

Figure 6:
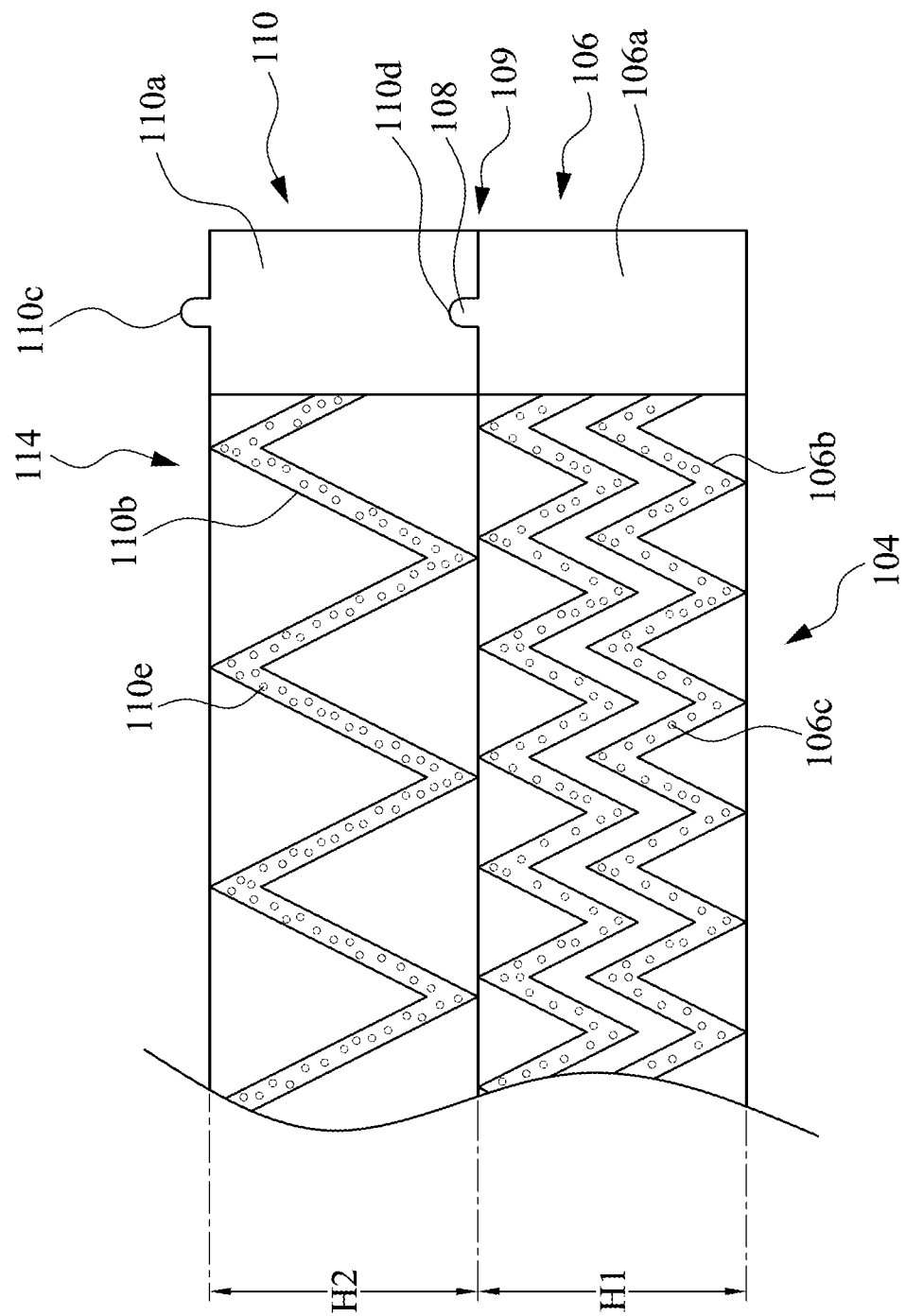
FIG. 6 illustrates a cross-sectional view of a stackable air filter module according to still another embodiment of the disclosure.

Reference is made to FIG. 6, which illustrates a cross-sectional view of a stackable air filter module according to still another embodiment of the disclosure. In the embodiment, a multilayer filter body 106b is adhered within the metal frame 106a of the base gas filter unit 106. The filter materials 106c contained in the different layers of the filter body 106b may be different or the same, but their service life times are basically similar. In this embodiment, the filter body 106b contains a filter material 106c that has a service life greater than that of the filter body 110b. The height H1 of the metal frame 106a is greater than or equal to the height H2 of the filter frame 110a.

In sum, the air filter module of the present invention includes a base gas filter unit and an additional gas filter unit, and the service life of the filter material contained in the base gas filter unit is greater than the service life of the filter material contained in the additional gas filter unit. In order to reduce a replace frequency of or not replace the base gas filter unit, increasing a replace frequency of or replacing only the additional gas filter unit containing the short-life filter material, a total frequency of replacing the gas filter units in the air filter module can be reduced. In addition, the air filter module utilizes the airtight interface between the gas filter units, which enable the gas filter units to be vertically stacked without the glue, and has a positioning function to prevent the left and right offset of the stacked gas filter units.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A stackable air filter module, comprising:
   a base gas filter unit comprising a metal frame and at least one first filter body disposed within at least one filter channel of the metal frame, and the metal frame having an upper surface continually extending to surround the filter channel of the metal frame completely; and
   at least one additional gas filter unit detachably superposed on the base gas filter unit, the additional gas filter unit comprising a filter frame and a second filter body disposed within a filter channel of the filter frame, the filter frame comprising an outer metal frame and an inner non-metal fireproof frame surrounded by the outer metal frame, the inner non-metal fireproof frame having a lower surface that is mutually complementary to the upper surface of the metal frame to form an airtight interface between the additional gas filter unit and the base gas filter unit,
   wherein filter materials contained in the first filter body having a service life greater than that of filter materials contained in the second filter body.

2. The stackable air filter module of claim 1, wherein filter materials contained in the first filter body have the service life two times greater than that of filter materials contained in the second filter body.

3. The stackable air filter module of claim 1, wherein the filter channel of the metal frame has a cross-sectional area equal to that of the filter channel of the filter frame.

4. The stackable air filter module of claim 1 further comprising at least one second additional gas filter unit detachably superposed on the at least one additional gas filter unit, the second additional gas filter unit comprises a third filter body, wherein filter materials contained in the second filter body have a service life greater than that of filter materials contained in the third filter body.

5. The stackable air filter module of claim 1, wherein the filter frame is made from metal materials.

6. The stackable air filter module of claim 1, wherein the filter frame is made from non-metal fireproof materials.

7. The stackable air filter module of claim 1, wherein the filter channel of the metal frame has a cross-sectional area equal to that of the filter channel of the filter frame.

8. The stackable air filter module of claim 1, wherein the at least one filter channel of the metal frame comprises multiple filter channels.

9. The stackable air filter module of claim 1, wherein the metal frame has a height greater than or equal to that of the filter frame.

\* \* \* \* \*